US007720141B2

(12) United States Patent
Fang et al.

(10) Patent No.: US 7,720,141 B2
(45) Date of Patent: May 18, 2010

(54) DECISION FEEDBACK RESTORE OF DC SIGNALS IN A RECEIVER

(75) Inventors: Emerson S. Fang, Fremont, CA (US); Gladney Asada, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 920 days.

(21) Appl. No.: 11/469,937

(22) Filed: Sep. 5, 2006

(65) Prior Publication Data

US 2008/0057900 A1    Mar. 6, 2008

(51) Int. Cl.
*H03H 7/30*     (2006.01)
*H03H 7/40*     (2006.01)
*H03K 5/159*    (2006.01)

(52) U.S. Cl. .................... 375/233; 455/296
(58) Field of Classification Search ........... 455/296; 375/233, 232, 230, 229
See application file for complete search history.

(56) References Cited

U.S. PATENT DOCUMENTS

| 6,192,228 | B1 * | 2/2001 | Agahi-Kesheh et al. | 455/296 |
|---|---|---|---|---|
| 7,015,448 | B2 * | 3/2006 | Barna | 250/208.1 |
| 2002/0068541 | A1 * | 6/2002 | Helio et al. | 455/340 |
| 2003/0095061 | A1 * | 5/2003 | Tokioka | 341/155 |
| 2004/0146075 | A1 * | 7/2004 | Kennedy et al. | 372/10 |
| 2005/0026571 | A1 * | 2/2005 | Yang et al. | 455/78 |
| 2006/0220739 | A1 * | 10/2006 | Ben-Ayun et al. | 330/140 |
| 2007/0046529 | A1 * | 3/2007 | Suzuki et al. | 342/194 |

OTHER PUBLICATIONS

Kandlikar, Milind and Jacobs, Ira, "Analysis of Quantized Feedback Low-Frequency Restoration in Digital Regenerators," IEEE Transactions on Communications, vol. 38, No. 8, pp. 1118-1120, Aug. 1990.
Shakiba, Mohammad H., "A 2.5Gb/s Adaptive Cable Equalizer," IEEE International Solid-State Circuits Conference, ISSCC99, pp. 396-397 and 483, 1999.
Shang, Stephen et al., "A Technique for DC-Offset Removal and Carrier Phase Error Compensation in Integrated Wireless Receivers," in Proceedings of the 2003 International Symposium on Circuits and Systems, ISCAS, vol. 1, pp. 1-173-1-176, May 25-28, 2003.
HyperTransport™ I/O Link Specification Revision 3.00, HyperTransport Technology Consortium, 428 pages, Apr. 21, 2006.
Boser, B., "Offset Control," EECS 247 Lecture 27, A/D, DSP, University of California at Berkeley, 15 pages, 2002, retrieved from URL: inst.eecs.berkeley.edu/~n247/sp05/lectures/L27%20lecture.pdf.

* cited by examiner

*Primary Examiner*—David C Payne
*Assistant Examiner*—Brian J Stevens
(74) *Attorney, Agent, or Firm*—Zagorin O'Brien Graham LLP

(57) ABSTRACT

An AC coupled receiver incorporates a decision feedback restore technique that is readily implemented on a monolithic integrated circuit to reduce or eliminate effects of baseline wander in a non-return-to-zero (NRZ) data receiver. In at least one embodiment of the invention, a method includes at least substantially attenuating at least a DC portion of a received signal to generate a first signal. The method includes generating a low frequency signal based at least in part on a reference signal selected from a plurality of reference signals. The method includes generating a restored signal based at least in part on the first signal and the low frequency signal.

25 Claims, 6 Drawing Sheets

US 7,720,141 B2

DECISION FEEDBACK RESTORE OF DC SIGNALS IN A RECEIVER

CROSS-REFERENCE TO RELATED APPLICATION(S)

BACKGROUND

1. Field of the Invention

This application is related to integrated circuits and more particularly to communications interfaces of integrated circuits.

2. Description of the Related Art

A communications system may use AC coupling techniques to reduce effects of low frequency disturbances, e.g., undesirable DC offsets. Typically, AC coupling of circuit nodes is implemented by high-pass filtering a received signal. However, time-domain characteristics of the high-pass filter may introduce baseline wander in a non-return-to-zero (i.e., NRZ) data receiver. The baseline wander can substantially affect receiver data recovery and increase receiver bit error rates.

SUMMARY

An AC coupled receiver incorporates a decision feedback restore technique that is readily implemented on a monolithic integrated circuit to reduce or eliminate effects of baseline wander in a non-return-to-zero (NRZ) data receiver. In at least one embodiment of the invention, a method includes at least substantially attenuating at least a DC portion of a received signal to generate a first signal. The method includes generating a low frequency signal based at least in part on a reference signal selected from a plurality of reference signals. The method includes generating a restored signal based at least in part on the first signal and the low frequency signal.

In at least one embodiment of the invention, an integrated circuit includes a terminal and a receiver circuit coupled to the terminal. The receiver circuit is configured to generate a restored signal based at least in part on a high frequency portion of a signal received from the terminal and at least a filtered reference signal received from a selected one of at least a plurality of signal reference nodes.

In at least one embodiment of the invention, a system includes a first integrated circuit comprising a transmitter circuit. The system includes a second integrated circuit comprising a receiver circuit responsive to a received signal. The received signal is received from the first integrated circuit. The receiver circuit is configured to generate a restored signal based at least in part on a high frequency portion of the received signal and at least a filtered reference signal received from a selected one of at least a plurality of signal reference nodes.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

In an exemplary communications system, a signal containing AC and DC components may experience frequency dependent loss and dispersion during the transmission process. AC components (e.g., frequency components close to half the bit-rate) may be substantially attenuated although the DC component is not substantially attenuated, resulting in a DC offset being present at the receiver. Equalization of the received data may amplify that DC offset. The DC offset may substantially shift levels of a received data signal such that a data sampling circuit (e.g., a decision receiver or slice circuit) incorrectly samples the data and increases bit-error rates associated with receive interface data recovery. A DC offset may appear on an eye diagram of the received signal as a reduction in an effective eye opening, e.g., a reduction in the peak-to-peak height of the eye opening, which is indicative of increased bit-error rates.

Figure 1:
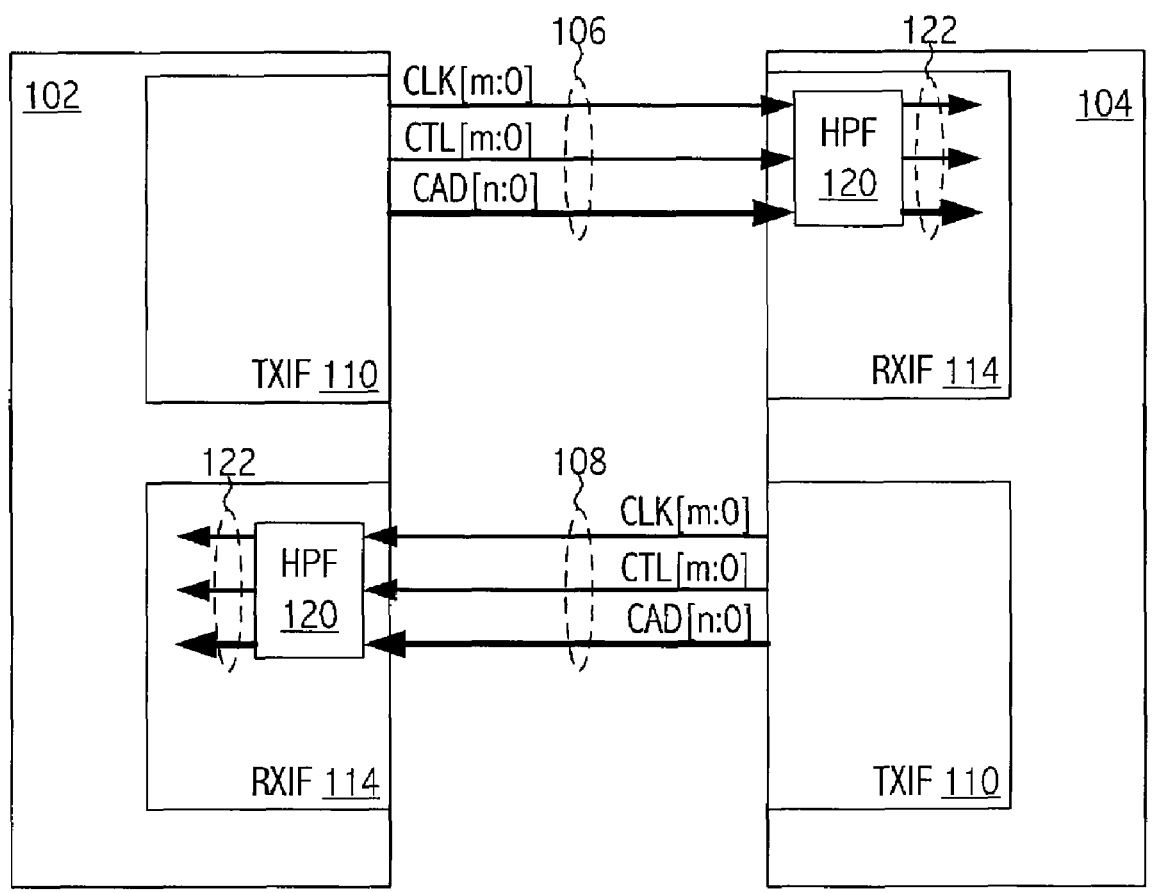
FIG. 1 illustrates a block diagram of two integrated circuit devices coupled by a communications link.

Referring to FIG. 1, integrated circuit communications interfaces (e.g., transmit interfaces 110 and receive interfaces 114 of integrated circuits 102 and 104) may incorporate AC coupling techniques to reduce effects of low frequency disturbances, e.g., undesirable DC offsets, and reduce the need for a common ground reference between integrated circuits. As referred to herein, AC coupling is the coupling of one circuit to another circuit through a capacitor or other device that passes the varying portion (i.e., AC) but not the static (i.e., DC) characteristics of an electrical signal. For example, signals transmitted on communications lines 106 and 108 are high-pass filtered (e.g., by high-pass filters 120) in receive interfaces 114 to generate a substantially varying signal or high-frequency signal (e.g., AC signal 122). However, the transmitted signal may include significant energy at low frequencies (e.g., DC) that is lost by AC coupling. Note that receive interfaces 114 may include pads, electrostatic discharge (i.e., ESD) circuitry and/or termination circuits or other circuits (not shown), which may be coupled between communications lines 106 and high-pass filters 120.

Figure 2:
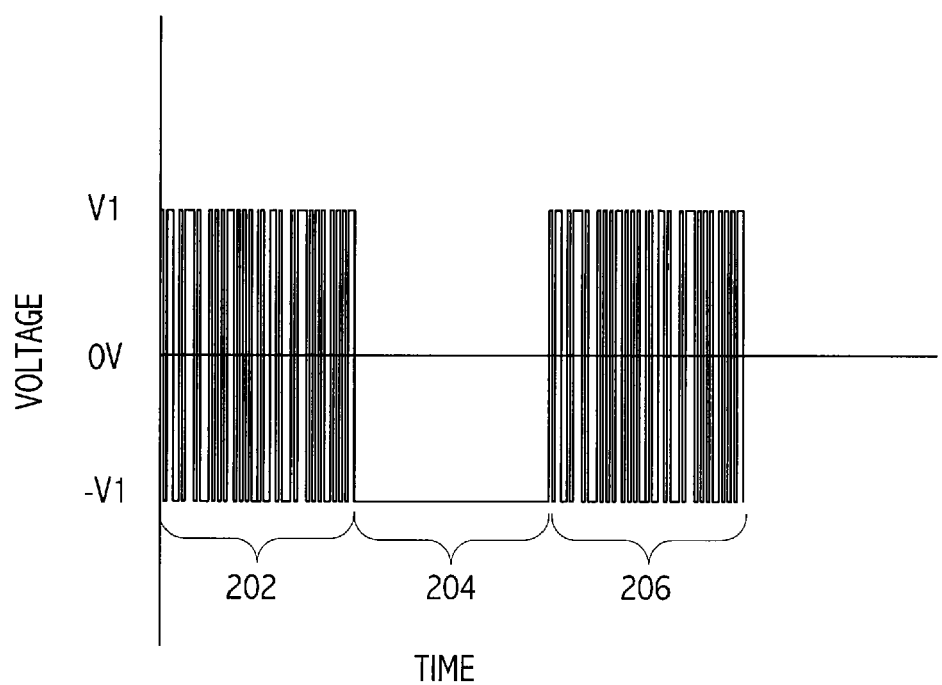
FIG. 2 illustrates an exemplary waveform consistent with a non-return-to-zero (NRZ) data signal.

Referring to FIG. 2, an exemplary scrambled data stream may contain portions that fluctuate between values indicative of '1's and '0's (e.g., data stream portions 202 and 206). The data stream may also include portions having a substantial number of consecutive '1's or '0's (e.g., data stream portion 204). Simple scrambling may decrease the likelihood of such long runs of '1's and/or '0's in the data stream, but may not guarantee that the data stream is free of long runs of consecutive '1's and '0's in the data stream (e.g., due to an imperfectly balanced scrambling code and/or data interaction). Although complex coding techniques (e.g., 8b 10b coding) may guarantee that the data stream is free of long runs of consecutive '1's and '0's in the data stream, these complex coding techniques typically reduce the effective data rate due to coding overhead and introduce latencies due to coding and decoding. Substantial numbers of consecutive '1's or '0's in the data stream may introduce a low-frequency (e.g., DC) component to the transmitted signal. In addition, even portions of the scrambled data stream that fluctuate between '1's and '0's (e.g., data stream portions 202 and 206) may include an imbalance in the number of '1's and '0's over a long period of time. Such an imbalance introduces a non-zero, low-frequency (e.g., DC) component into the transmitted signal.

Figure 3:
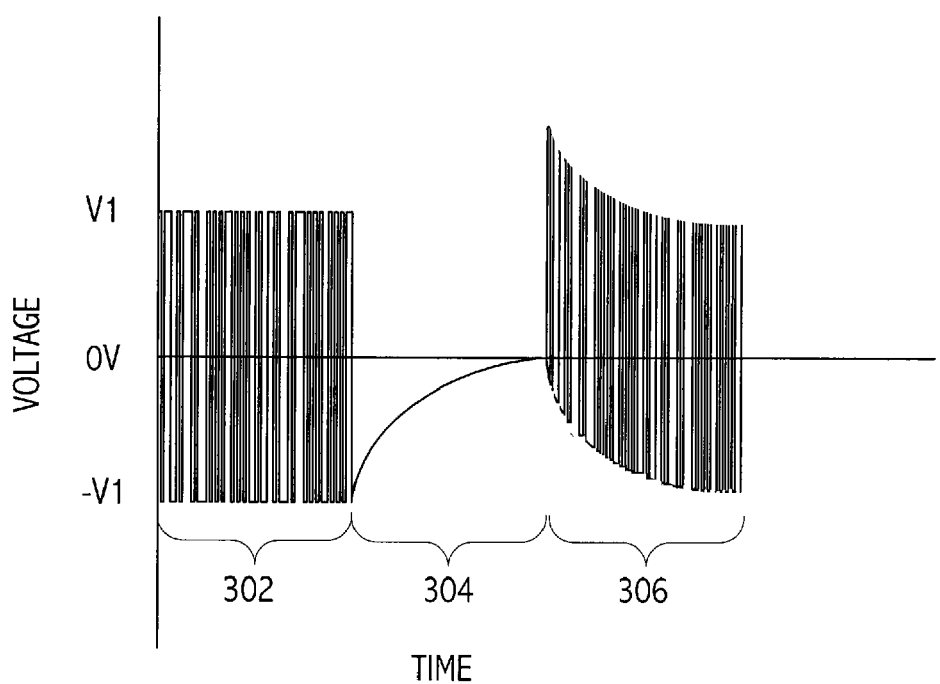
FIG. 3 illustrates an exemplary waveform consistent with an NRZ data signal received by an AC coupled receiver interface.

The AC coupling filter, e.g., high-pass filter 120 of FIG. 1, may not sufficiently track such low-frequency components in the received signal. For example, high-pass filter 120 is defined by a time constant (e.g., $\tau=RC$ of a first order high-pass filter) that determines the rate at which the filter circuit responds. At time $t=\tau$, the impulse response of the filter has reached 1/e times its value at $t=0$ and the step response is within 1/e of its final value. Therefore, as $\tau$ is decreased, the impulse response decays more rapidly and the rise time of the step response becomes shorter. The time constant of high-pass filter 120 has no substantial effect when the data stream has zero mean (e.g., data stream portion 302 of FIG. 3). However, high-pass filter 120 may introduce decay into AC signal 122 (e.g., data stream portions 304 and 306 of FIG. 3) due to loss of low frequency components of the received signal. The decay is a function of $\tau$ of high-pass filter 120. The baseline magnitude of AC signal 122 may be shifted such that decision thresholds in receiver interface 114 approach or coincide with the magnitude of AC signal 122, which may substantially reduce the opening of the data eye (i.e., the peak-to-peak height of the data eye) and increase bit-error rates of the received data.

Figure 4:
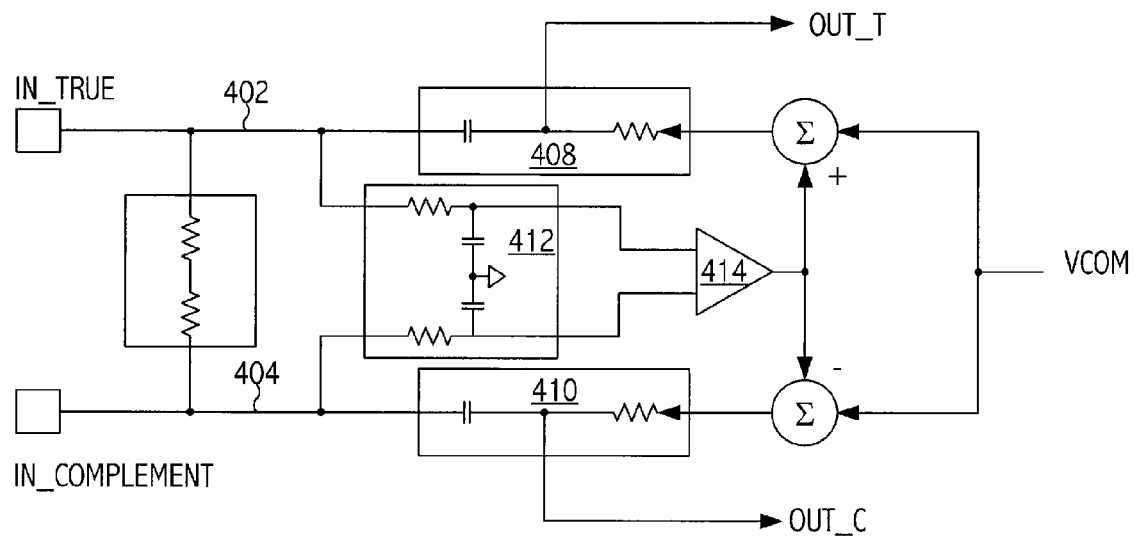
FIG. 4 illustrates an exemplary analog sensing and analog feedback restore technique for compensating DC signal loss by an AC coupled receiver interface.

Accordingly, an exemplary receiver interface restores a low-frequency component (e.g., DC component) of the transmitted signal that was lost as a result of AC coupling. Referring to FIG. 4, an exemplary technique for compensating low frequency components of the received signal includes analog feedback. Analog sensing circuit 412 low-pass filters the received signal and the output of sensing buffer 414 is added to a receiver common mode voltage (e.g. VCOM) generated by a receiver common mode biasing circuit (not shown). The sum is provided to filters 408 and 410, which reconstruct the received signal by low-pass filtering the sum and combining the result with a high-pass filtered version of the received signal. The analog feedback technique may be indiscriminate, i.e., DC offsets introduced by data stream imbalances and/or long-run data values, as discussed above, are restored along with DC offsets introduced by other sources. In addition, restoration of the DC offset introduced by data stream imbalances and/or long run data values may not be achievable by narrow-bandwidth low-pass filter circuits. For example, a system operating at a data rate in the range of approximately 2.4 Giga-bits per second (Gbps) to approximately 5.4 Gbps may encounter data streams runs of approximately 40 consecutive bits having the same value occurring with probability of approximately $10^{-12}$ with a corresponding baseline wander of approximately 30 mV. In order to reduce the baseline wander to approximately 5 mV, the low-pass filter circuit should be able to respond to changes in much less than 40 unit intervals (e.g., full restoration should occur after 6 unit intervals and the low-pass filter circuit should have a relatively high cutoff frequency, which may be expensive to implement in a monolithic integrated circuit). However, such a wide bandwidth analog sensing circuit will also restore differential noise with non-zero bias over 6 unit intervals, thereby corrupting the restored signal.

Figure 5A:
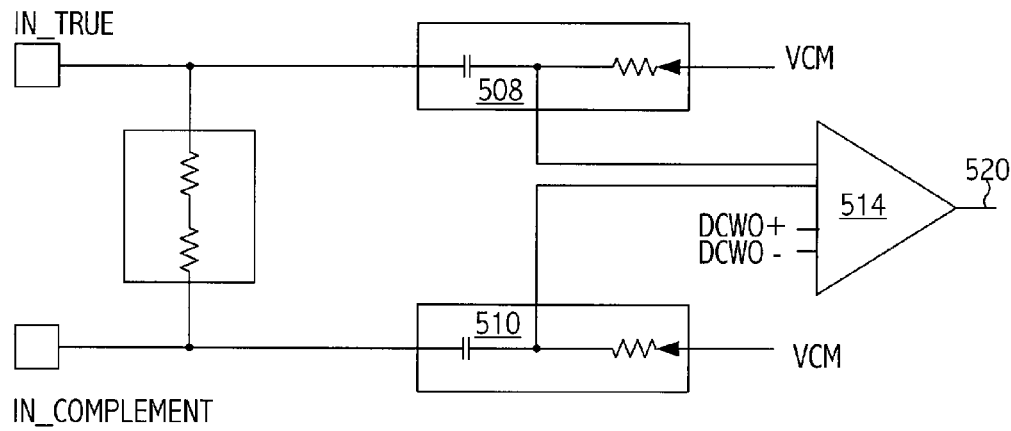
FIGS. 5A and 5B illustrate an exemplary equalizer restore technique for compensating DC signal loss by an AC coupled receiver interface.
Figure 5B:
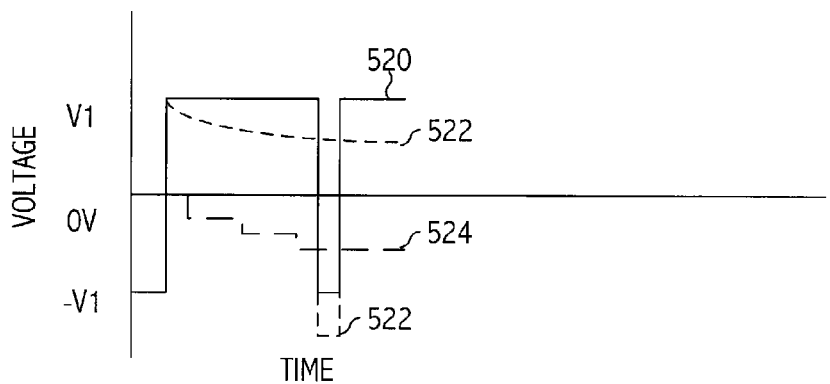

Referring to FIGS. 5A and 5B, another technique for compensating the DC components of the received signal includes using a receive interface equalizer circuit. An exemplary receive interface may include a decision feedback equalizer (DFE), which may be idle in some applications. Accordingly, the DFE circuit (e.g., circuit 514) may be configured as a filter to apply a DC wander offset (e.g., DCWO+ and DCWO- in FIG. 5A and voltage 524 in FIG. 5B) to the high-pass filtered receive signal to compensate for the baseline wander (e.g., voltage 522) to generate a restored signal (e.g., voltage 520). In at least one embodiment of integrated circuit 104, at a data rate in the range of approximately 2.4 Giga-bits per second (Gbps) to approximately 5.4 Gbps, approximately 15.5% of the DC signal amplitude may be lost via high-pass filter 120 over a period of 40 unit intervals. In order to satisfy specifications (e.g., DC signal amplitude loss of less than 5 mV over 40 unit intervals), compensation for the DC wander (i.e., baseline wander), by applying a DC offset to the signal, occurs relatively quickly (e.g., in less than 7 unit intervals time from the signal arriving at the AC coupling circuit). In addition, the DC wander offset (e.g., DCWO+ and DCWO-) should correspond to the shape of the RC decay. Thus, the wander offset imposes speed and settling time requirements on a digital-to-analog converter generating the offset that are not typically required for a DFE. In addition, operation of the DFE restoration circuit for arbitrary run lengths may require the offsets to have a large dynamic range.

Figure 6:
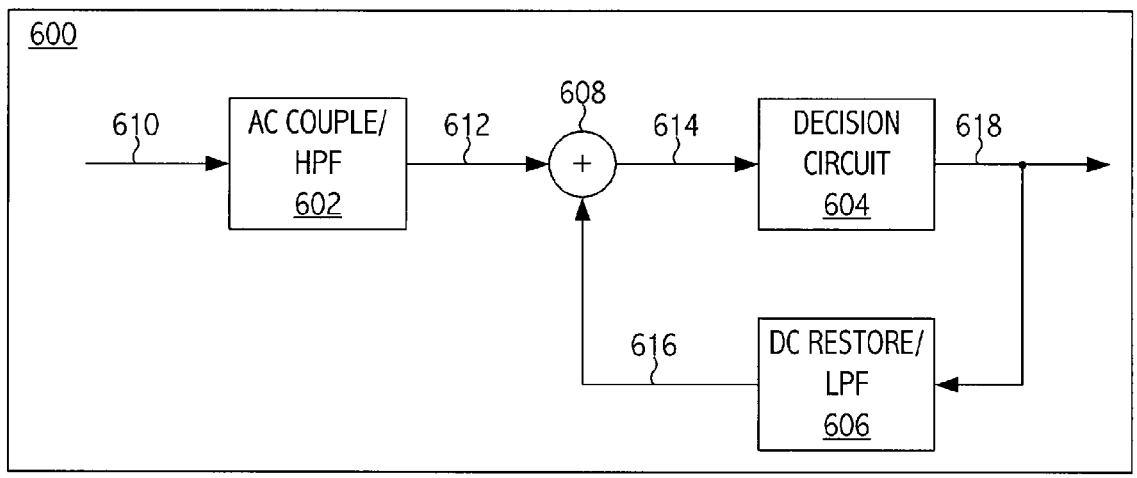
FIG. 6 illustrates an exemplary block diagram of a decision feedback restore circuit for compensating DC signal loss by an AC coupled receiver interface consistent with at least one embodiment of the invention.

Referring to FIG. 6, a technique for substantially reducing or eliminating effects of DC or baseline wander in an AC coupled receive interface includes decision feedback restore of low-frequency components of a received signal. A low-frequency signal (e.g., low-frequency signal 616) corresponding to the received signal is reconstructed by low-pass filtering an output (e.g., signal 618) of a decision circuit (e.g., decision circuit 604, which may be a slice circuit or other suitable decision circuit). Low-frequency signal 616 is combined with AC signal 612 to generate a restored version of the received signal, e.g., restored signal 614, which is then processed by the receive circuitry. Unlike the analog restore technique described above, the decision feedback restore technique does not indiscriminately restore the DC signal. In at least one embodiment, the decision feedback restore technique is a digital algorithm that is readily implemented in a CMOS manufacturing process, or other suitable process. In addition, the decision feedback restore technique can be implemented with a fast response time and without a high-speed, precision DAC circuit.

Figure 7:
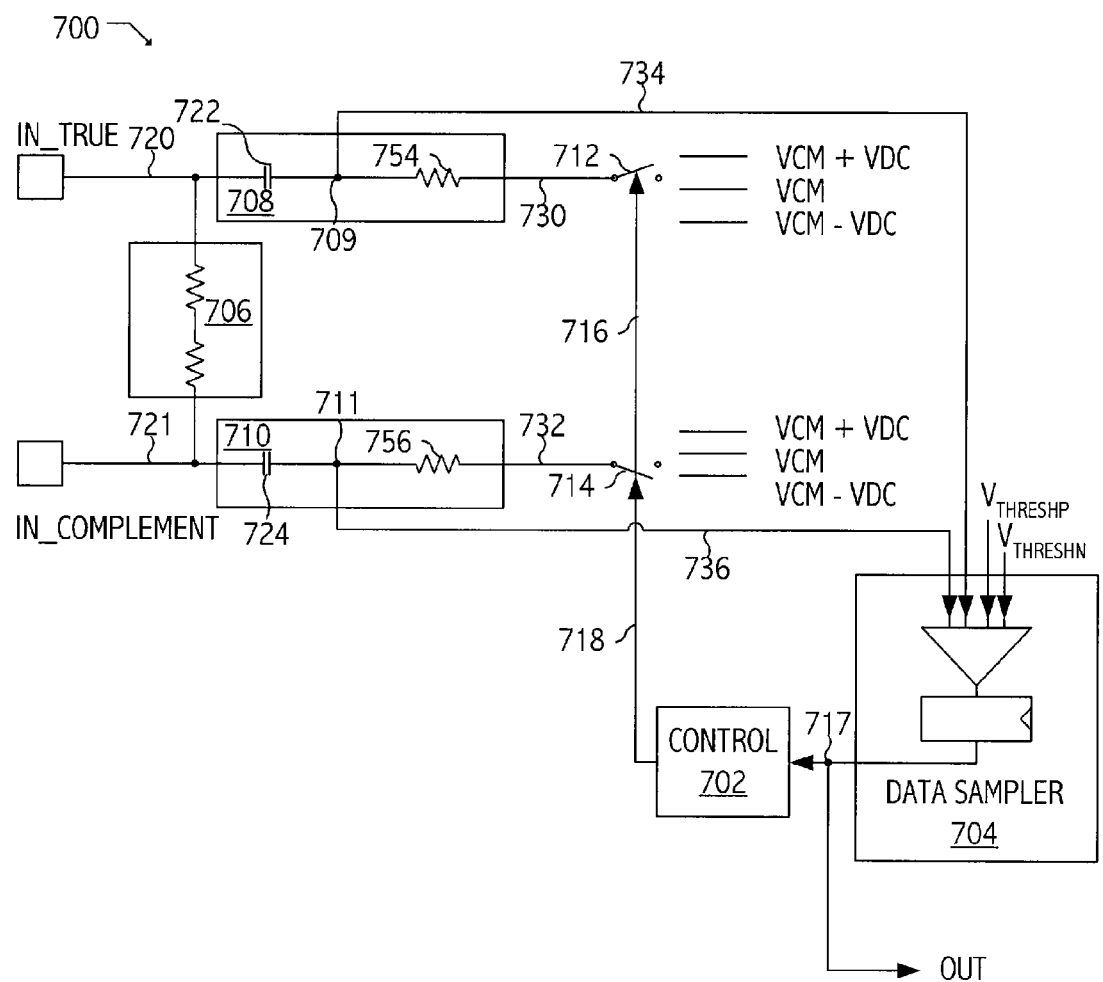
FIG. 7 illustrates exemplary portions of a decision feedback restore circuit compensating DC signal loss by an AC coupled receiver interface consistent with at least one embodiment of the invention.

Referring to FIG. 7, a decision feedback restore circuit (e.g., decision feedback restore circuit 700) consistent with at least one embodiment of the invention, receives a signal (e.g., the received signal on the differential node formed by nodes 720 and 721). In addition to termination circuit 706, decision feedback restore circuit 700 may include pads and electrostatic discharge (i.e., ESD) circuitry coupled to nodes 720 and 721. Decision feedback restore circuit 700 high-pass filters the received signal using filter 708 and filter 710. The resulting high-frequency signal is received by nodes 709 and 711. As referred to herein, a high-frequency signal is a signal having a frequency response consistent with an output signal received from a high-pass filter having a time constant $\tau_H$. A restore signal is generated by low-pass filtering a reference signal supplied to differential node 730 and 732, and the resulting low-frequency signal is received by differential node 709 and 711. As referred to herein, a low-frequency signal is signal having a frequency response consistent with an output signal received from a low-pass filter having a time constant $\tau_L$.

In at least one embodiment of decision feedback restore circuit 700, $\tau_H$ associated with the high-pass filter (i.e., AC coupling filter) that generates the high-frequency signal is substantially equal to $\tau_L$ associated with the low-pass filter (i.e., restore filter) that generates the low-frequency signal (i.e., the filtered version of the reference signal). Note that although separate filter circuits may be used to implement the AC coupling filter and the restore filter functions, in at least one embodiment of decision feedback restore circuit 700, the AC coupling filter and the restore filter functions are implemented using the same passive devices (e.g., resistor 754 and capacitor 722 of filter 708 and resistor 724 and capacitor 756 of filter 710). The time constant of the AC coupling filter equals the time constant of the restore filter (i.e., $\tau_H = \tau_L = RC$), which substantially reduces or eliminates issues related to matching low-pass filter characteristics to high-pass filter characteristics and which increases the insensitivity to process variations of decision feedback restore circuit 700. In at least one embodiment of decision feedback restore circuit 700, the RC time constant of filter 708 and filter 710 is substantially greater than a unit interval (e.g., RC time constant is approximately 100 ns or greater and a unit interval is approximately 200 ps-400 ps).

Nodes 709 and 711 sum the high-frequency signal generated by filters 708 and 710, respectively, and the low-frequency signal generated by filters 708 and 710, respectively, to generate the restored signal on differential node 734 and 736. Data sampler 704 compares the restored signal on differential node 734 and 736 to a threshold value (e.g., differential threshold value $V_{THRESHP}$ and $V_{THRESHN}$) to output a decision value, i.e., an indicator of whether the data is a '1' or a '0.' One or more state elements may store the decision value or a plurality of sequential decision values, and provide the stored decision value or values (e.g., decision value 717) to control circuit 702.

Control circuit 702 configures switches 712 and 714 to generate signals 730 and 732 based on the one or more decision values. In at least one embodiment of decision feedback restore circuit 700, control circuit 702 implements an algorithm that switches the signals 730 and 732 between a plurality of DC voltage levels. For example, three DC reference voltage levels, VCM, VCM+VCD, and VCM-VDC are generated by voltage reference generator circuits. The middle level (e.g., VCM) is the receiver common mode voltage level, (e.g., approximately 0.6 Volts (V)-approximately 0.7 V), which may depend on the receive interface power supply voltage or other receive interface specifications. The offset level (e.g., VDC) used to determine the level above the VCM and below VCM is based on the transmit DC signal swing (e.g., approximately 300 mV, with no transmit de-emphasis, to approximately 150 mV or less, with 6 dB of transmit de-emphasis). In at least one embodiment of decision feedback restore circuit 700, the received signal is based on a transmitted signal generated without de-emphasis equalization. A target voltage level for VDC is the single-ended voltage swing generated at the transmitter, e.g., the DC voltage generated when transmitting a constant one. Switches 712 and 714 operate synchronously, i.e., when switch 712 selects VCM+VDC, switch 714 selects VCM-VDC, when switch 712 selects VCM, switch 714 also selects VCM, and when switch 712 selects VCM-VDC, switch 714 selects VCM+VDC.

Although more complicated algorithms may be used, control circuit 702 may implement a simple decision feedback restore algorithm. For example, where S[n] is the voltage on node 730 and D[n] is the digital value on node 717:

$S[n] = VCM + VDC$ if $D[n] = 1$, $S[n] = VCM - VDC$ if $D[n] = 0$, and

S[n]=VCM when electrically idle (e.g., IN_TRUE and IN_COMPLEMENT are substantially equal to the transmit common mode voltage). If the locally generated VDC deviates from its ideal value, the restored signal will retain a residual baseline:

$$\text{residual} = (VDC_{ideal} - VDC) \times \left(1 - e^{-\frac{runlength \times UI}{RC}}\right).$$

The simple decision feedback restore algorithm has a relatively short feedback latency, which allows reducing the time constant of the AC coupling filter (e.g., $\tau_H$ of filter 708 and 710) to decrease the capacitance of capacitor 722 and 724 and thereby reduce area consumed by filters 708 and 710. However, in some applications, high frequency signal loss due to filter circuit reactance may set a lower limit on the capacitance value. In at least one embodiment of decision feedback restore circuit 700, the RC time constant of filter 708 and filter 710 is substantially greater than a unit interval (e.g., RC time constant is approximately 100 ns or greater and a unit interval is approximately 200 ps-400 ps).

Note that other decision feedback restore algorithms can be used. In at least one embodiment of decision feedback restore circuit 700, control circuit 702 may examine decision value 717 over N unit intervals. Control circuit 702 configures switches 712 and 714 to provide a total feedback for the interval that equals the net difference between the number of '1's and the number of '0's detected during the interval. For example, if the number of '1's exceeds the number of '0's by 2, then switch 712 is set to VCM+VDC for 2 unit intervals and set to VCM for the rest of the N bit intervals). This technique may result in less toggling on switches 712 and 714, thus consuming less power. However, the DC restoration is slower than a simple decision feedback restore algorithm due to increased feedback latency.

In at least one embodiment of decision feedback restore circuit 700, data is received from a transmitter using transmit de-emphasis techniques, i.e., techniques using more than one amplitude to indicate '1's and more than one amplitude to indicate '0's. For example, a two-tap post cursor transmit de-emphasis equalizer will generate signal amplitudes consistent with the following:

previous data='00', current data='1'→1+α+β→A1,
previous data='10', current data='1'→1+α-β→A2,
previous data='00', current data='1'→1-α+β→A3,
previous data='11', current data='1'→1-α-β→A4, where α and β are filter coefficients that result in four unique amplitudes. When the number of '1's and '0's are balanced, the transmit signal (e.g., the average differential voltage of the transmitted signal) is DC balanced, regardless of the data pattern. Accordingly, the target VDC value is the voltage swing that the transmitter generates when transmitting a long run length. An exemplary transmitter including a two-tap post-cursor equalizer transmits a data stream having a normalized average DC voltage:

$$\frac{1}{N}\left(\sum_{n=1}^{N} x[n] - \alpha \sum_{n=1}^{N} x[n-1] - \beta \times \sum_{N=1}^{N} x[n-2]\right) = \frac{N1 - N0}{N} \times (1 - \alpha - \beta),$$

where x[n] is the n-th bit value, α and β are the equalizer tap coefficients, and N1 and N0 are the number of '1's and '0's, respectively. The target VDC value is a scaling of the full swing voltage (e.g., 300 mV) by 1−α−β, and the averaging function of '1's and '0's received is realized by the decision feedback logic and the low-pass RC network:

(1−α−β)×full swing.

Note that since the RC time constant is substantially greater than the unit interval, transient behavior of switches 712 and 714 is effectively filtered out by filter 708 and filter 710.

When receiving data from a transmitter that uses data scrambling only (i.e., not 8b10b coding), although run length control is worse than for a 8b10b coded data stream, the run length is still statistically limited at a given bit-error rate, thus providing an additional reduction in the residual wander. Appropriate bias voltages at the terminals of capacitors 722 and 724 may be established during an initialization sequence. For example, a transition-rich DC-balanced training pattern may be transmitted to an integrated circuit including decision feedback restore circuit 700 for a period of time prior to transmission of real data. During that time, the decision feedback restore mechanism is disabled (e.g., setting switches 712 and 714 to select VCM), the bias voltage for decision feedback restore circuit 700 achieves a steady state value, and a clock recovery loop on the integrated circuit achieves lock. In general, the time constant of the AC coupling filter is small compared to typical clock and data recovery circuit training times. Thus, incorporation of decision feedback restore circuit 700 in a clock and data recovery system may not substantially increase an initialization period.

In at least one embodiment of an interface including decision feedback restore circuit 700, configuring VDC with a predetermined value, as described above, sufficiently improves a data eye opening as compared to the AC coupled receiver without decision feedback restoration of a DC component. For example, a signal having data rate in the range of approximately 2.4 Giga-bits per second (Gbps) to approximately 5.4 Gbps transmitted with scrambling, but without 8b10b coding, may have a received data eye opening having approximately 110 mV height and approximately 155 ps width before the AC coupling network. After the AC coupling network, with decision feedback restoration of a DC component disabled, the received data eye opening may have approximately 88.4 mV height and approximately 141 ps width. However, after the AC coupling network, with decision feedback restoration of a DC component enabled with VDC at 80% of a target transmit DC level, the received data eye opening may have approximately 103 mV height and approximately 154 ps width. Assuming that an ideal DC restoration achieves a data eye opening height of approximately 108 mV, setting VDC with approximately 20% error, still achieves a data eye opening within approximately 5% of an ideal value.

Figure 8:
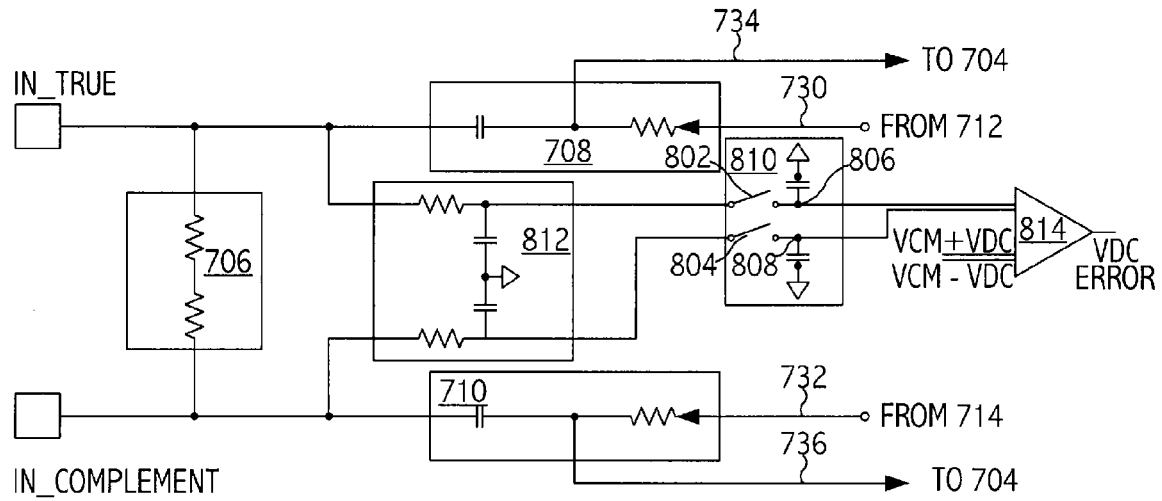
FIG. 8 illustrates exemplary portions of a decision feedback restore circuit including offset calibration circuitry for compensating DC signal loss by an AC coupled receiver interface consistent with at least one embodiment of the invention.

In at least one embodiment of an interface including decision feedback restore circuit 700, a VDC sensing and auto-calibration technique is implemented. Referring to FIG. 8, a technique for sensing the VDC error includes low-pass filter circuit 812 in decision feedback restore circuit 700. Low-pass filter circuit 812 senses the DC component of the received signal, which is compared to VDC. Additional control circuitry (e.g., in control circuit 702) detects long run lengths of received data levels (e.g., ten or more consecutive '1's or '0's) based at least in part on the output of data sampler 704. After a long run length of received data levels, the received data signal has a DC level. When a long run length is detected, the input voltage swing should be at VDC value. Thus, control circuit 702 opens switches 802 and 804 to hold the data sampled on nodes 806 and 808, respectively. The sampled value of VDC is compared to the locally generated VDC value and an error signal (e.g., VDC ERROR) is generated by compare circuit 814, which may be a differential amplifier, a comparator, or other suitable circuit. The error signal may be used to adjust the local VDC setting (e.g., a digital word may be incremented or decremented to adjust the reference voltage level generated by a DAC or other voltage reference generator circuit). In at least one embodiment of decision feedback restore circuit 700, a low-pass filter circuit (not shown) is included in control circuit 702 to reduce the effect of noise on the sample and hold circuitry (e.g., sample and hold circuit 810). Accordingly, the decision feedback restore circuit 700 may track slow variations in the received signal level without a training pattern.

Figure 9:
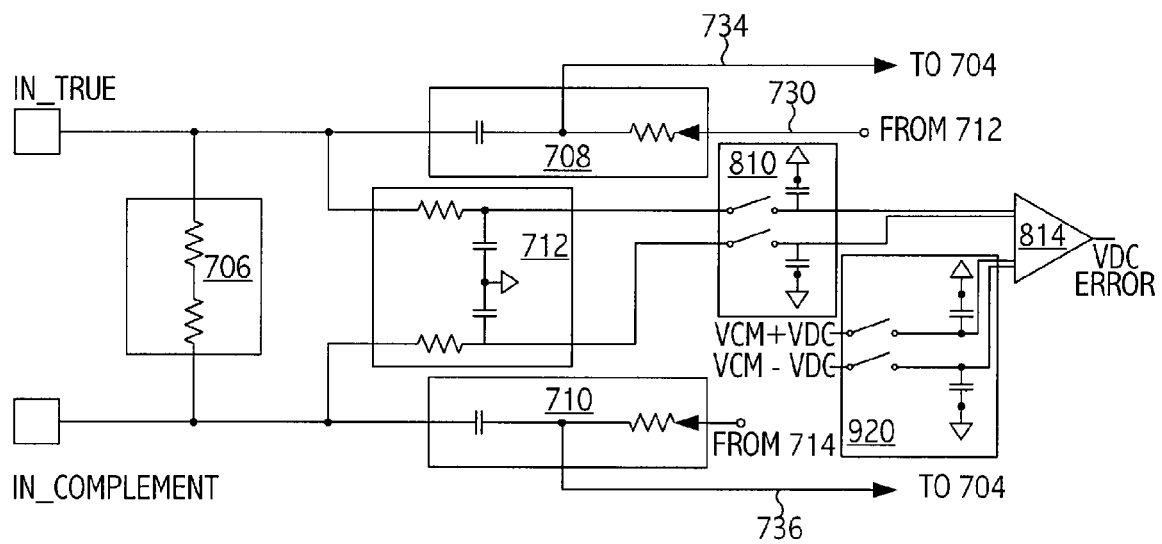
FIG. 9 illustrates exemplary portions of a decision feedback restore circuit including offset calibration circuitry for compensating DC signal loss by an AC coupled receiver interface consistent with at least one embodiment of the invention.

Referring to FIG. 9, the auto-calibration technique may account for feedback latency using sample-and-hold circuits 810 and 920. For example, if seven consecutive '1's or '0's are detected, control circuit 702 may configure sample-and-hold circuits 810 and 920 to be in a hold position. If the feedback latency is three unit intervals or less, after receiving the tenth consecutive '1' or tenth consecutive '0', the VDC ERROR signal from compare circuit 814 may be used. Sample-and-hold circuits 920 may be included to address matching issues.

Decision feedback restore circuit 700 may be formed on an integrated circuit, which reduces or eliminates coupling capacitors on a printed circuit board including the integrated circuit. Thus, decision feedback restore circuit 700 may reduce cost of a system that would otherwise include coupling capacitors on the printed circuit board. Although decision feedback restore circuit 700 is illustrated as a differential circuit, in at least one embodiment, decision feedback restore circuit 700 is single-ended.

Figure 10:
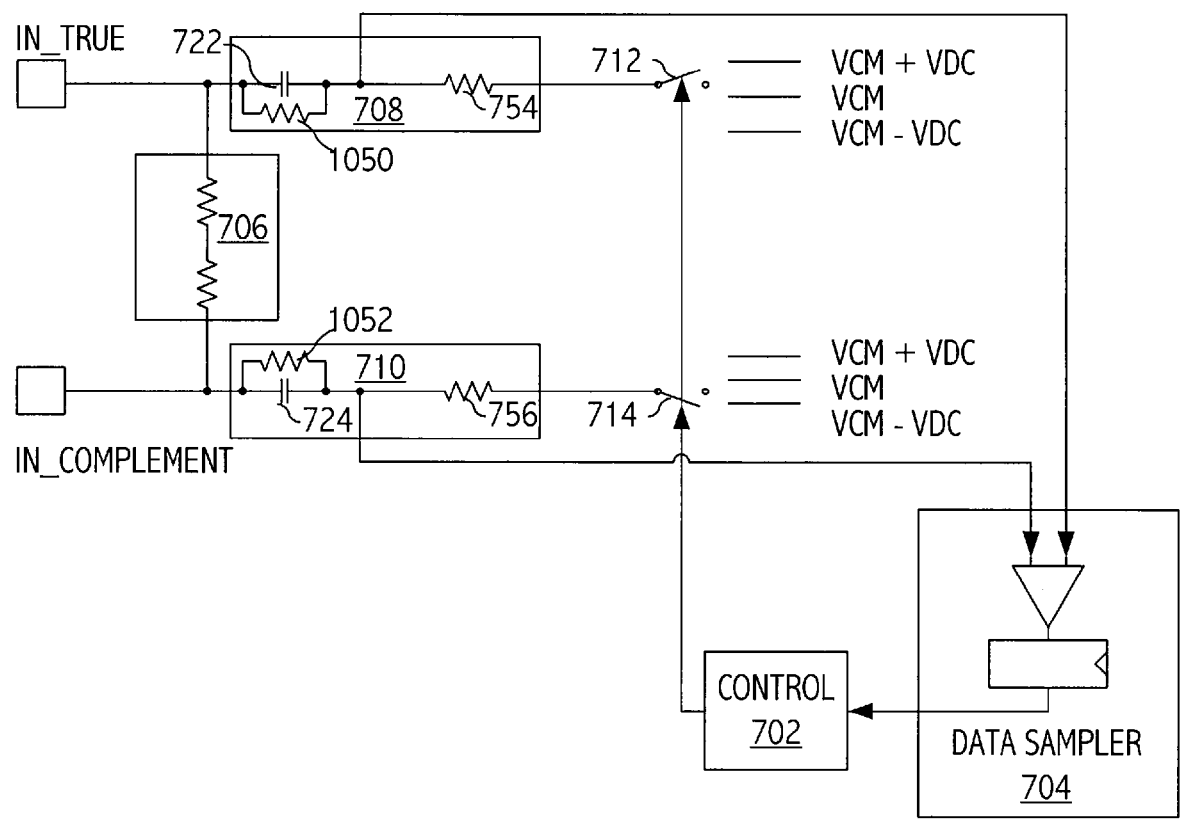
FIG. 10 illustrates exemplary portions of a decision feedback restore circuit for compensating DC signal loss in a pseudo-AC coupled receiver interface consistent with at least one embodiment of the invention.

Referring to FIG. 10, a semi-AC coupled technique incorporates resistors 1050 and 1052 in parallel (e.g., by selectively coupling using switches or other suitable configurations) with the capacitors in filters 708 and 710, respectively. By sizing resistors 1050 and 1052 to be substantially the same as resistors 754 and 756, respectively, then the DC common mode voltage is attenuated by a factor of two. The receiver common mode voltage is different from the transmit common mode voltage to shift the DC common mode voltage seen by the receiver. Capacitors 722 and 724 still pass the AC component of the received signal, i.e., there will be no substantial signal loss. This technique reduces, by approximately one half, the uncertainty of VDC being substantially different from the input signal level. The semi-AC coupled technique may be used during testing to access the receiver circuitry without blocking the DC component of the received signal.

While circuits and physical structures are generally presumed, it is well recognized that in modern semiconductor design and fabrication, physical structures and circuits may be embodied in computer-readable descriptive form suitable for use in subsequent design, test or fabrication stages. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer-readable medium includes at least disk, tape, or other magnetic, optical, semiconductor (e.g., flash memory cards, ROM), or electronic medium.

The description of the invention set forth herein is illustrative, and is not intended to limit the scope of the invention as set forth in the following claims. For example, while the invention has been described in an embodiment in which interfaces between integrated circuits are AC coupled, one of skill in the art will appreciate that the teachings herein can be utilized to in interfaces between amplifier circuits on a monolithic integrated circuit. Variations and modifications of the embodiments disclosed herein, may be made based on the description set forth herein, without departing from the scope and spirit of the invention as set forth in the following claims.

What is claimed is:

1. A method comprising:
   at least substantially attenuating at least a DC portion of a received signal to generate a first signal;
   generating a low frequency signal based at least in part on a reference signal selected from a plurality of reference signals, wherein at least one of the plurality of reference signals has a level based at least in part on an offset signal and a bias level of the restored signal;
   adjusting the offset signal based at least in part on the received signal to generate an adjusted offset signal, the adjusting being based at least in part on multiple consecutive transitionless unit intervals of the received signal;
   generating at least one of the plurality of reference signals based at least in part on the adjusted offset signal; and
   generating a restored signal based at least in part on the first signal and the low frequency signal.

2. The method, as recited in claim 1, further comprising:
   sampling the restored signal to generate a digital feedback signal; and
   selecting the selected reference signal from the plurality of reference signals based at least in part on the digital feedback signal.

3. The method, as recited in claim 1, further comprising:
   filtering the selected reference signal to generate the low frequency signal,
   wherein a time constant associated with the filtering is substantially greater than a unit interval associated with the received signal.

4. The method, as recited in claim 1, wherein the offset signal is based at least in part on a voltage level of a version of the received signal generated by a transmitter.

5. The method, as recited in claim 1, wherein the adjusting comprises: sensing a level of at least a DC portion of the received signal.

6. The method, as recited in claim 1, wherein the adjusting comprises: sampling and holding the level of the DC portion of the received signal; and generating the adjusted offset signal based at least in part on a sampled and held version of the DC portion of the received signal, thereby accounting for a latency of a digital feedback signal used in selecting the reference signal.

7. The method, as recited in claim 1, wherein a bias level of the received signal and a bias level of the restored signal have substantially different magnitudes.

8. The method, as recited in claim 1, wherein individual ones of the plurality reference signals are DC signals.

9. An integrated circuit comprising:
   a terminal; and
   a receiver circuit coupled to the terminal, the receiver circuit being configured to generate a restored signal based at least in part on a high frequency portion of a signal received from the terminal and a filtered reference signal received from a selected one of at least a plurality of signal reference nodes,
   wherein the receiver circuit comprises:
      at least one voltage reference circuit configured to generate an offset signal used to generate at least one reference signal on at least an individual one of the plurality of signal reference nodes,
      a sensing circuit configured to sense a DC portion of the received signal; and
      a comparator circuit configured to generate an adjustment value based at least in part on the DC portion of the received signal and at least one signal on an individual one of the plurality of signal reference nodes; and
      at least one voltage reference circuit configured to generate the offset signal based at least in part on the adjustment value.

10. The integrated circuit, as recited in claim 9, wherein the receiver circuit further comprises:
    a filter circuit configured to generate the restored signal based at least in part on the high frequency portion of the received signal and the filtered version of the reference signal;
    a sampling circuit configured to generate a digital feedback signal based at least in part on a sampled version of the restored signal;
    a control circuit configured to generate a select signal based at least in part on the digital feedback signal; and
    at least one select circuit configured to provide the reference signal by selectively coupling one of a plurality of signal reference nodes to the filter circuit based at least in part on the select signal.

11. The integrated circuit, as recited in claim 10, wherein the filter circuit includes a high-pass filter configured to generate the high frequency portion of the received signal and the filter circuit includes a low-pass filter configured to generate the filtered version of the reference signal, the high-pass filter and the low-pass filter having substantially the same time constant.

12. The integrated circuit, as recited in claim 11, wherein the high-pass filter and the low-pass filter include the same passive components of the filter circuit.

13. The integrated circuit, as recited in claim 10, wherein a time constant of the filter circuit is substantially greater than a unit interval associated with the received signal.

14. The integrated circuit, as recited in claim 9,
    wherein the offset signal is based at least in part on a target level of a version of the received signal generated by a transmitter coupled to the terminal.

15. The integrated circuit, as recited in claim 9, wherein the receiver further comprises:
    at least a first sample and hold circuit coupled between the sensing circuit and the comparison circuit; and at least a second sample and hold circuit coupled between the at least one voltage reference circuit and the comparison circuit, wherein the first and second sample and hold circuits synchronize the adjustment value with the digital feedback signal.

16. A system comprising:

a first integrated circuit comprising a transmitter circuit; and a second integrated circuit comprising a receiver circuit responsive to a received signal, the received signal being received from the first integrated circuit, the receiver circuit being configured to generate a restored signal based at least in part on a high frequency portion of the received signal and at least a filtered reference signal received from a selected one of at least a plurality of signal reference nodes, wherein the receiver circuit comprises:

at least one voltage reference circuit configured to generate an offset signal used to generate at least one reference signal on at least an individual one of the plurality of signal reference nodes;

a sensing circuit configured to sense a DC portion of the received signal;

a comparator circuit configured to generate an adjustment value based at least in part on the DC portion of the received signal and at least one signal on an individual one of the plurality of signal reference nodes; and at least one voltage reference circuit configured to generate the offset signal based at least in part on the adjustment value.

17. The system, as recited in claim 16, wherein the receiver circuit further comprises:

a filter circuit configured to generate the restored signal based at least in part on the high frequency portion of the received signal and the filtered version of the reference signal;

a sampling circuit configured to generate a digital feedback signal based at least in part on a sampled version of the restored signal;

a control circuit configured to generate a select signal based at least in part on the digital feedback signal; and at least one select circuit configured to provide the reference signal by selectively coupling one of a plurality of reference voltage nodes to the filter circuit based at least in part on the select signal.

18. The system, as recited in claim 17, wherein the filter circuit includes a high-pass filter configured to generate the high frequency portion of the received signal and the filter circuit includes a low-pass filter configured to generate the filtered version of the reference signal, the high-pass filter and the low-pass filter having substantially the same time constant.

19. The system, as recited in claim 18, wherein the high-pass filter and the low-pass filter include the same passive components of the filter circuit.

20. The system, as recited in claim 17, wherein a time constant of the filter circuit is substantially greater than a unit interval associated with the received signal.

21. The system, as recited in claim 16, wherein the offset signal is based at least in part on a target level of a version of the received signal generated by a transmitter coupled to the receiver.

22. The system, as recited in claim 16, wherein the receiver circuit further comprises:

at least a first sample and hold circuit coupled between the sensing circuit and the comparison circuit; and at least a second sample and hold circuit coupled between the at least one voltage reference circuit and the comparison circuit, wherein the first and second sample and hold circuits synchronize the adjustment value with the digital feedback signal.

23. The system, as recited in claim 16, wherein the transmitter circuit operates using a first bias voltage and the receiver operates with a second bias voltage, the first bias voltage being substantially different from the second bias voltage.

24. An apparatus comprising:

means for selecting a reference signal from a plurality of reference signals, the selecting being based at least in part on a digital feedback signal;

means for generating a restored signal based at least in part on a high frequency portion of a received signal and a filtered version of the reference signal, wherein at least one of the plurality of reference signals has a level based at least in part on a bias level of the restored signal and an offset signal; and means for adjusting the offset signal based at least in part on the received signal, the adjusting being during a transitionless period of multiple consecutive unit intervals of the received signal.

25. The apparatus, as recited in claim 24, further comprising:

means for generating the digital feedback signal based at least in part on the restored signal.

* * * * *